United States Patent [19]
Everard et al.

[11] Patent Number: 5,347,672
[45] Date of Patent: Sep. 20, 1994

[54] PORTABLE, STOWABLE KNOCK-DOWN RAMP

[75] Inventors: Donald G. Everard, Kent; William Gorman, Gig Harbor, both of Wash.

[73] Assignee: Homecare Products, Inc., Kent, Wash.

[21] Appl. No.: 998,958

[22] Filed: Dec. 31, 1992

[51] Int. Cl.$^5$ .................................................. E01D 15/00
[52] U.S. Cl. ..................... 14/69.5; 160/133; 160/235
[58] Field of Search .................. 14/69.5, 71.1; 52/588; 160/133, 201, 229.1, 235, 273.1, 351, 205, 209, 270; 193/38; 404/41; 414/537; 5/191, 195

[56] References Cited

U.S. PATENT DOCUMENTS

| | | | |
|---|---|---|---|
| 127,948 | 5/1872 | Bassett | 160/229.1 X |
| 1,758,372 | 5/1930 | Pflaum | 414/537 |
| 2,089,380 | 8/1937 | Kammerer | 20/64 |
| 2,571,337 | 10/1951 | Burnham | 61/48 |
| 3,100,556 | 8/1963 | de Ridder | 189/34 |
| 3,307,719 | 3/1967 | Martin, Jr. | 214/85 |
| 3,359,594 | 12/1967 | Pastoor | 160/235 |
| 3,385,182 | 5/1968 | Harvey | 94/13 |
| 3,424,323 | 1/1969 | Barnaby | 214/85 |
| 3,516,560 | 6/1970 | Brighton | 214/85 |
| 3,642,156 | 2/1972 | Stenson | 214/85 |
| 3,735,440 | 5/1973 | Hetmanski | 14/71 |
| 3,742,911 | 7/1973 | Lehe et al. | 119/28 |
| 3,936,898 | 2/1976 | Poe | 14/72 |
| 3,984,891 | 10/1976 | Weinmann | 14/69.5 |
| 4,301,851 | 11/1981 | Gitkin | 160/133 X |
| 4,341,253 | 7/1982 | Eyerle | 160/133 |
| 4,352,597 | 10/1982 | Kay | 405/219 |
| 4,519,434 | 5/1985 | Forquer | 160/133 |
| 4,528,711 | 7/1985 | Packer | 14/69.5 |
| 4,807,921 | 2/1989 | Champie, III et al. | 160/235 X |
| 4,864,672 | 9/1989 | Altieri et al. | 14/69.5 |
| 4,990,049 | 2/1991 | Hargrove | 414/537 |
| 5,062,174 | 11/1991 | DaSalvo | 14/69.5 |

FOREIGN PATENT DOCUMENTS 1038445 8/1966 United Kingdom .

OTHER PUBLICATIONS

Home Care Products, "The EZ-Access R3000 Ramp for Electric Scooters, Manual, and Electric Wheelchairs," p. 2, publication date unknown.

Primary Examiner—Thuy M. Bui
Assistant Examiner—James A. Lisehora
Attorney, Agent, or Firm—Christenson, O'Connor, Johnson & Kindness

[57] ABSTRACT

Several elongated tread plates are pivotally connected together to form the central load-bearing portion of a ramp. Rigid side rails can be latched to the assembly of tread plates to maintain the tread plates with their upper surfaces coplanar. The side rails can be unlatched from the tread plate assembly, whereupon the tread plate assembly can be rolled to compact condition for storage.

18 Claims, 4 Drawing Sheets

PORTABLE, STOWABLE KNOCK-DOWN RAMP

FIELD OF THE INVENTION

The present invention relates to portable ramps, particularly portable ramps for wheelchairs and other vehicles for the disabled, elderly or others requiring transportation assistance, such as low-speed, three-wheeled motor scooters.

BACKGROUND OF THE INVENTION

Poe U.S. Pat. No. 3,936,898 discloses a "Portable Ramp for Wheelchairs" in which two side plates are joined at the center by a piano hinge so that the ramp can be folded about its longitudinal center line for portability. Each side plate is reinforced by bottom tubular braces. The ramp can be latched in folded condition, and a handle projects from one of the side plates for carrying the folded ramp. Hooks are provided for hanging the folded ramp from the frame of a wheelchair. The Poe construction is appropriate for only a very short ramp, if it is to be truly portable. For example, the Poe ramp might be appropriate for bridging a single low curb or step, but not for a high curb or several steps. Otherwise, the angle of inclination of the short ramp would be greater than desirable. In addition, the Poe ramp would not be appropriate for use with a three-wheeled motor scooter which has a steerable nose wheel in the center because the nose wheel would run over the central hinge.

Packer U.S. Pat. No. 4,528,711 discloses another type of "Portable Wheel Chair Ramp" in which two laterally spaced tracks have narrow channels for the wheels of a wheelchair. Each track is of telescoping construction so that the length of the track can be adjusted. The Packer construction is not appropriate for a three-wheeled motor scooter because there is no central support for the nose wheel.

Another known portable ramp construction uses side rails similar to the tracks of the Packer ramp, but without the inner upright flanges of the channels. Separate rigid panels can be interfitted with the tracks to form a full width ramp appropriate for motor scooters in addition to wheelchairs. Such a ramp is sold under the trademark EZ-ACCESS R3000 SCOOTER RAMP by Homecare Products, Inc. of Kent, Wash., primarily for use as a knock-down loading ramp for vans. The central panels are quite bulky and can be difficult to interlock with the telescoping side rails.

SUMMARY OF THE INVENTION

The present invention provides a ramp assembly which can be quickly and easily knocked down to a small number of light, compact component parts and which can be quickly and easily reassembled to form a sturdy ramp for a variety of uses. In the preferred embodiment, the central load-bearing portion of the ramp is formed by several transversely extending tread plates each of which is pivotally connected to an adjacent plate or plates. Rigid side rails can be latched to the tread plate assembly to maintain the tread plates with their upper surfaces coplanar. The side rails also reinforce the tread plate assembly. The side rails can be unlatched from the tread plate assembly, whereupon the tread plate assembly can be rolled to compact condition for storage. The side rails and rolled-up tread plate assembly can be carried in a drawstring bag that can be hung from the wheelchair or scooter frame for transportation to the next location in which a ramp is required.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
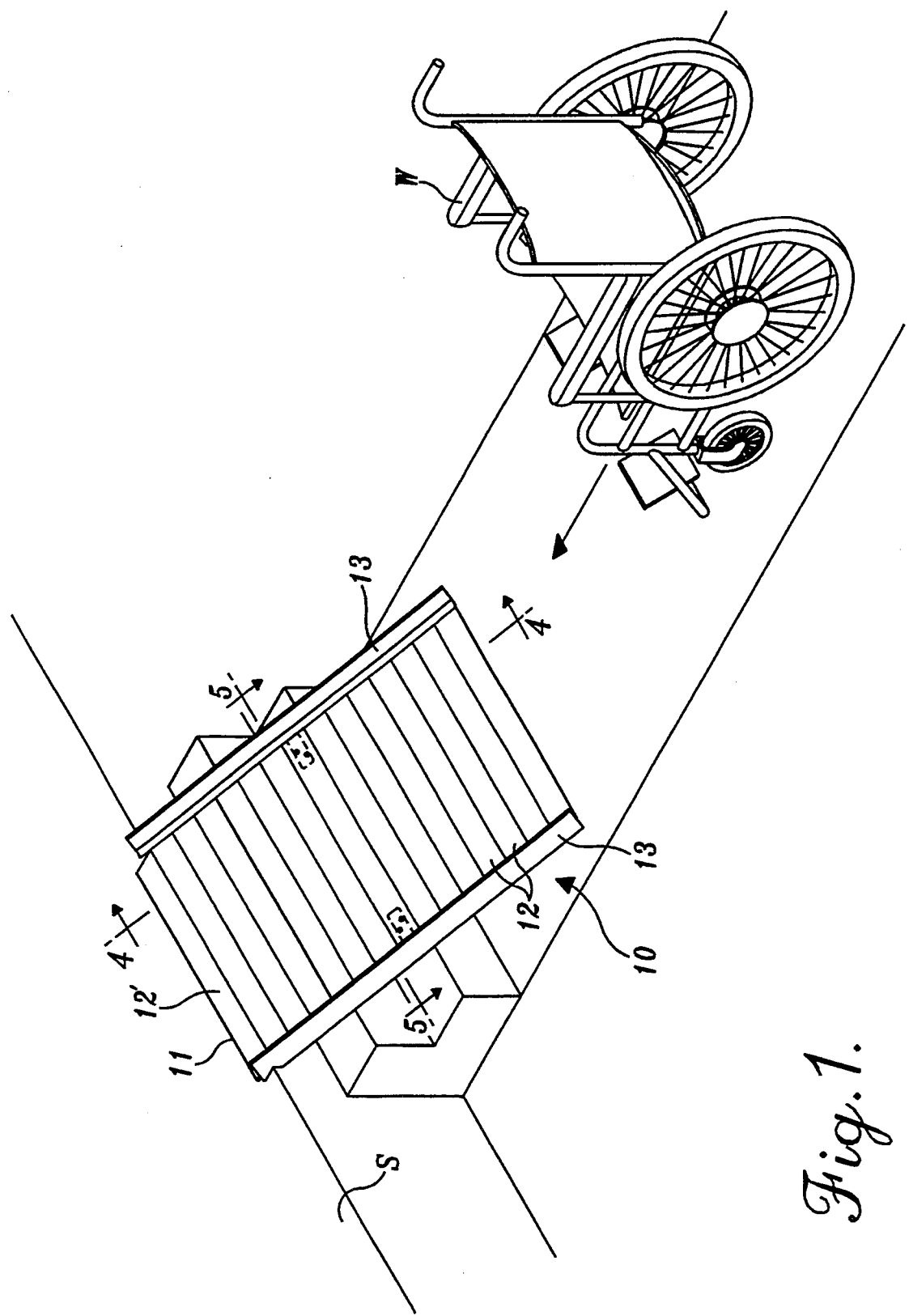
FIG. 1 is a top perspective of a portable knock-down ramp in accordance with the present invention in position bridging across a set of stairs so as to enable a wheelchair to roll along the ramp and over the stairs, such ramp including a central tread plate assembly and opposite side rails.

With reference to FIG. 1, the ramp 10 in accordance with the present invention includes a central portion 11 formed of transversely extending tread plates 12 of a light but strong metal such as aluminum alloy. The tread plates have long leading and trailing edges hinged together. With the tread plates positioned such that their upper surfaces are coplanar, separate side rails 13 are connected to maintain the tread plates in the coplanar condition. The side rails also are a strong, light metal and reinforce and rigidify the tread plate assembly at the sides. However, the top plate 12' is hinged to the remainder of the assembly only at its lower edge and is not held by the side rails so that the top plate can swing to a position for a smooth transition from the central portion of the ramp to the surface S on which the upper ends of the side rails are supported.

The assembled ramp is used to bridge over abrupt projections, obstructions or unstable terrain for convenient travel of a wheeled vehicle such as the wheelchair W shown in FIG. 1. Since the central portion of the ramp is flat and unobstructed, forming a continuous surface from side rail to side rail, the ramp also is appropriate for a three-wheeled vehicle such as a motor scooter with a nose wheel at the center. When not in use, the ramp can be disassembled by disconnecting the side rails 13 from the tread plate assembly 11. The tread plate assembly can be rolled to compact condition for storage and transportation to the next location where it is needed.

Figure 2:
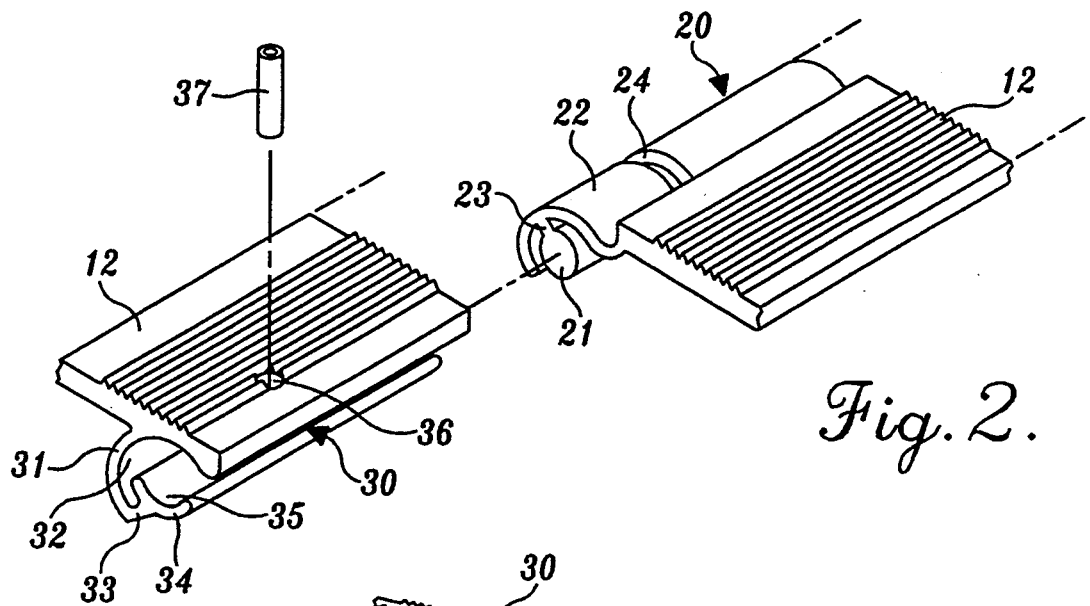
FIG. 2 is an enlarged fragmentary perspective of adjacent plates of the tread plate assembly, with parts shown in exploded relationship.

With reference to FIG. 2, the leading edges 20 and trailing edges 30 of the individual tread plates 12 are formed with complemental male and female hinge components which permit adjacent tread plates to be swung relative to each other in one direction but which provide structural strength when the plates are swung in the other direction so as to form the planar ramp surface. The leading edge portion 20 includes a cylindrical hinge rod 21 extending the full width of the tread plate and cantilevered from the center portion of a semicylindrical lip 22 by a narrow downwardly and rearwardly inclined neck or stem 23. At the trailing edge portion 30 of the adjacent tread plate, the female hinge component is formed by an arcuate lip 31 which, in combination with the arcuate underside of the trailing edge portion of the tread plate, defines a semicylindrical surface 32 facing rearward toward the next lower plate. Lip 31 leads to an upwardly and rearwardly inclined neck or stem 33 that supports a transversely extending shelf section 34 having an upwardly opening concave depression or groove 35.

The tread plates 12 can be interconnected by relative endwise sliding movement such that the rod 21 of a lower plate is received in the concave groove 35 of an upper plate. The semicylindrical lip 22 of the lower plate is slidingly engaged against the complemental surface 32 of the other plate.

To maintain the plates assembled, the upper tread plate has an upright through bore 36 in its trailing edge portion for a friction fit roll pin 37. The leading end portion of the adjacent plate has a slot 24 positioned to be aligned with the bore 36 when the plates are interconnected. Slot 24 extends through the lip 22, stem 23 and rod 21 so that, with the roll pin inserted in the bore 36 and received in the slot 24, the two tread plates are free to swing relative to each other about the axis of the rod but cannot move relatively endwise.

Figure 3:
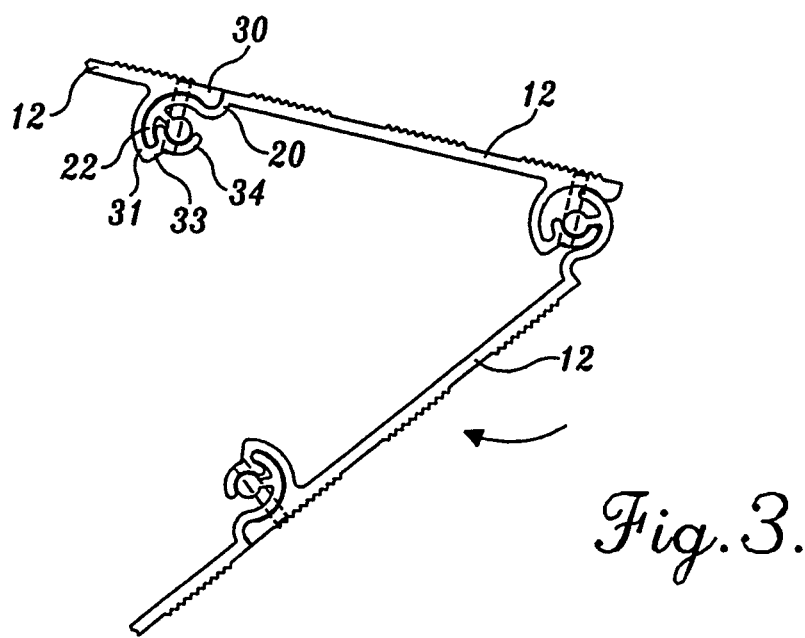
FIG. 3 is a somewhat diagrammatic side elevation of the tread plate assembly of the ramp in accordance with the present invention, illustrating the range of swinging motion of adjacent tread plates.

With reference to FIG. 3, the hinge construction provides a sturdy interconnection of adjacent tread plates 12. In the coplanar condition of the plates, the leading end portion 20 of the lower plate butts against the trailing end portion 30 of the plate immediately above it. The semicylindrical lip 22 of the lower plate seats in the base of the groove formed between the lip 31, stem 33 and shelf section 34 of the adjacent plate. Also, the arcuate upper surface of lip 22 is substantially contiguously engaged against the complemental surface of the adjacent plate. Consequently, the plates cannot be overswung from the coplanar condition, and substantial reinforcement is provided in the area of the hinges.

Figure 4:
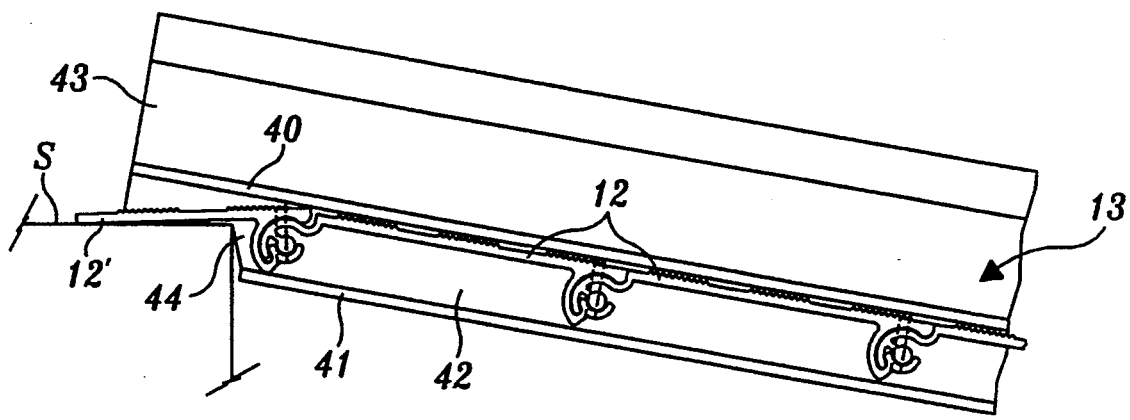
FIG. 4 is a fragmentary longitudinal vertical section along line 4—4 of FIG. 1, illustrating the central tread plate assembly received in a channel of one of the side rails.
Figure 5:
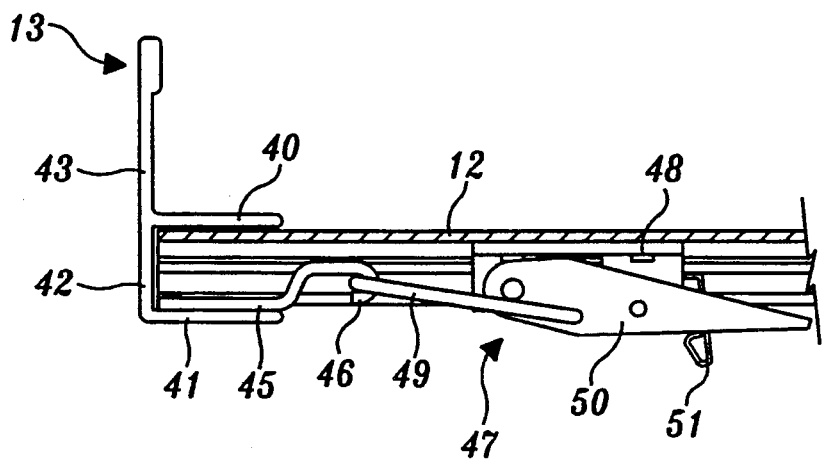
FIG. 5 is a further enlarged fragmentary transverse vertical section along line 5—5 of FIG. 1, illustrating mechanism for latching the tread plate assembly to the side rails.
Figure 6:
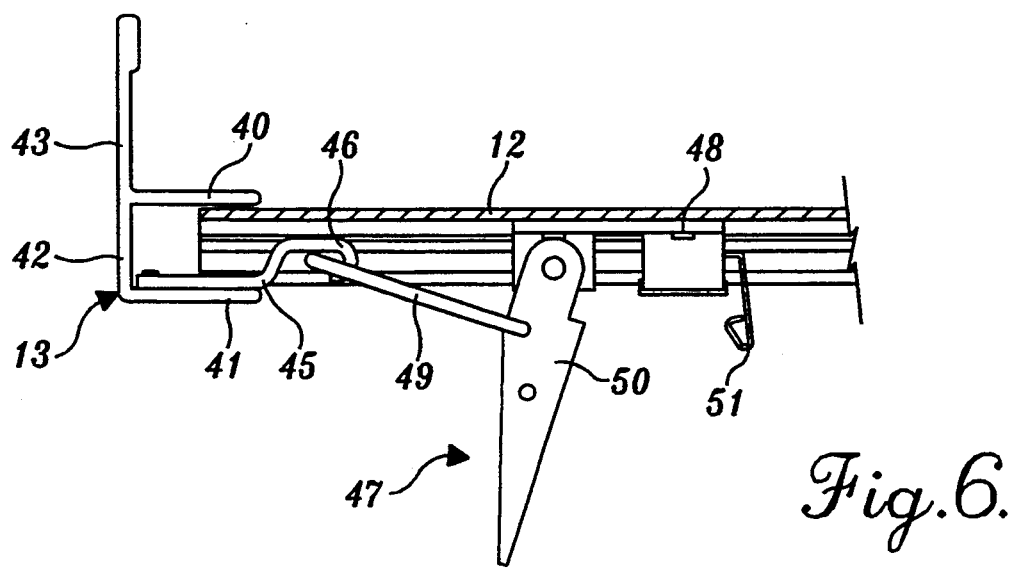
FIG. 6 is a transverse vertical section corresponding to FIG. 3 but with parts in different positions.

The construction of the side rails 13 is best seen in FIGS. 4, 5, and 6. Each side rail has a lower channel portion including upper and lower inwardly projecting arms or flanges 40 and 41, respectively, joined by an outer upright web 42. An additional upright flange 43 is integral with the lower channel portion of the side rail and extends upward beyond the upper flange 40, in line with the web 42, to form a curb. As best seen in FIG. 4, a notch 44 is cut in the underside of the upper portion of each rail for engaging against the upper support surface S on which the upper end of each rail rests and to deter the assembled ramp from slipping rearward.

In the assembled condition of the ramp, the interconnected tread plates 12 have their opposite side margins closely received in the inward-opening channels formed by the spaced flanges 40 and 41 of the side rails. Each tread plate has a substantially planar upper surface which can be roughened or grooved for increased traction of the wheeled vehicle as it rolls along the ramp. The channels are sized such that the coplanar top surfaces of the tread plates fit close beneath the top flanges 40 and the lowermost portions of the hinges rest on the lower flanges 41. Thus, the plates are held in the coplanar condition and the tread plate assembly is rigidified and reinforced at its sides.

Preferably, the interconnected tread plates are connected to the side rails by releasable latches. As best seen in FIG. 5 and FIG. 6, in the preferred embodiment a conventional strike 45 having a hooked end 46 is secured to the bottom flange 41 of each side rail. The strike cooperates with a conventional toggle latch 47 having a base portion 48 secured to the underside of a tread plate 12 between its hinged leading and trailing edges. The latch is positioned to be aligned with the strike 45 when the tread plate assembly is centered in the corresponding side rail 13. Latch 47 includes a wire link or bail 49 swingably carried by a lever arm 50. Bail 49 has a closed end for fitting in the hooked end 46 of strike 45. From the unlatched position shown in FIG. 6 the lever arm 50 can be swung to the position of FIG. 5 to tighten the bail 49 in the strike hook 46 and latch the side rail to the tread plate assembly. A conventional spring-loaded locking finger 51 can be provided for fitting through an aperture in the lever arm and maintain it in the latched position shown in FIG. 5 until the locking finger is manually released.

Figure 7:
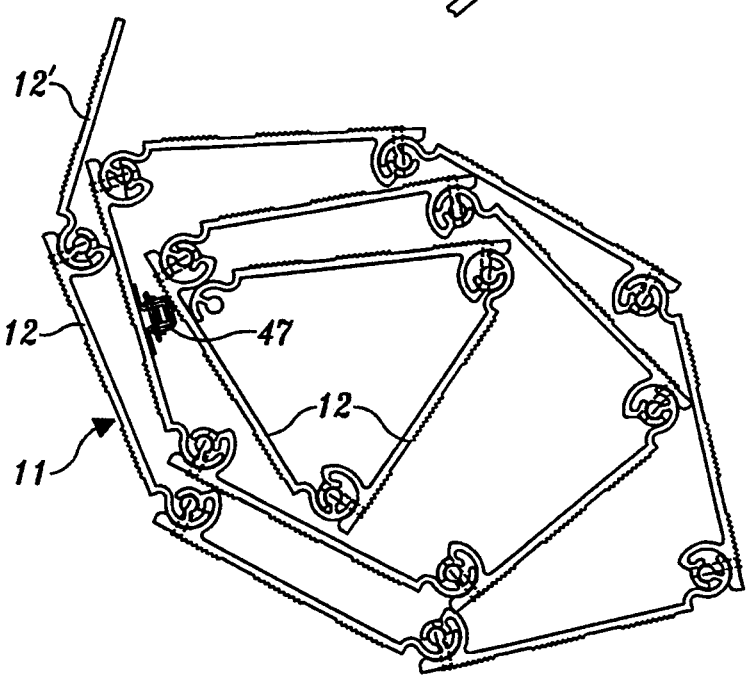
FIG. 7 (on the drawing sheet with FIGS. 2 and 3) is an end elevation of the tread plate assembly of the ramp in accordance with the present invention in compact, rolled-up condition.

The latch mechanism at the opposite side of the ramp assembly is identical to the mechanism shown in FIG. 5 and FIG. 6. With both locking levers 50 moved to the unlatched position (FIG. 6), the wire bails 49 can be swung downward so that both side rails 13 can be separated from the tread plate assembly. The tread plates then are free to pivot relative to each other and the entire assembly can be rolled up to the compact condition shown in FIG. 7. The rolled-up assembly and the two side rails 13 can be conveniently stored in a conventional drawstring bag (not shown) which can be hung from the wheelchair or scooter for convenient transport to the next location where a ramp is needed.

Figure 8:
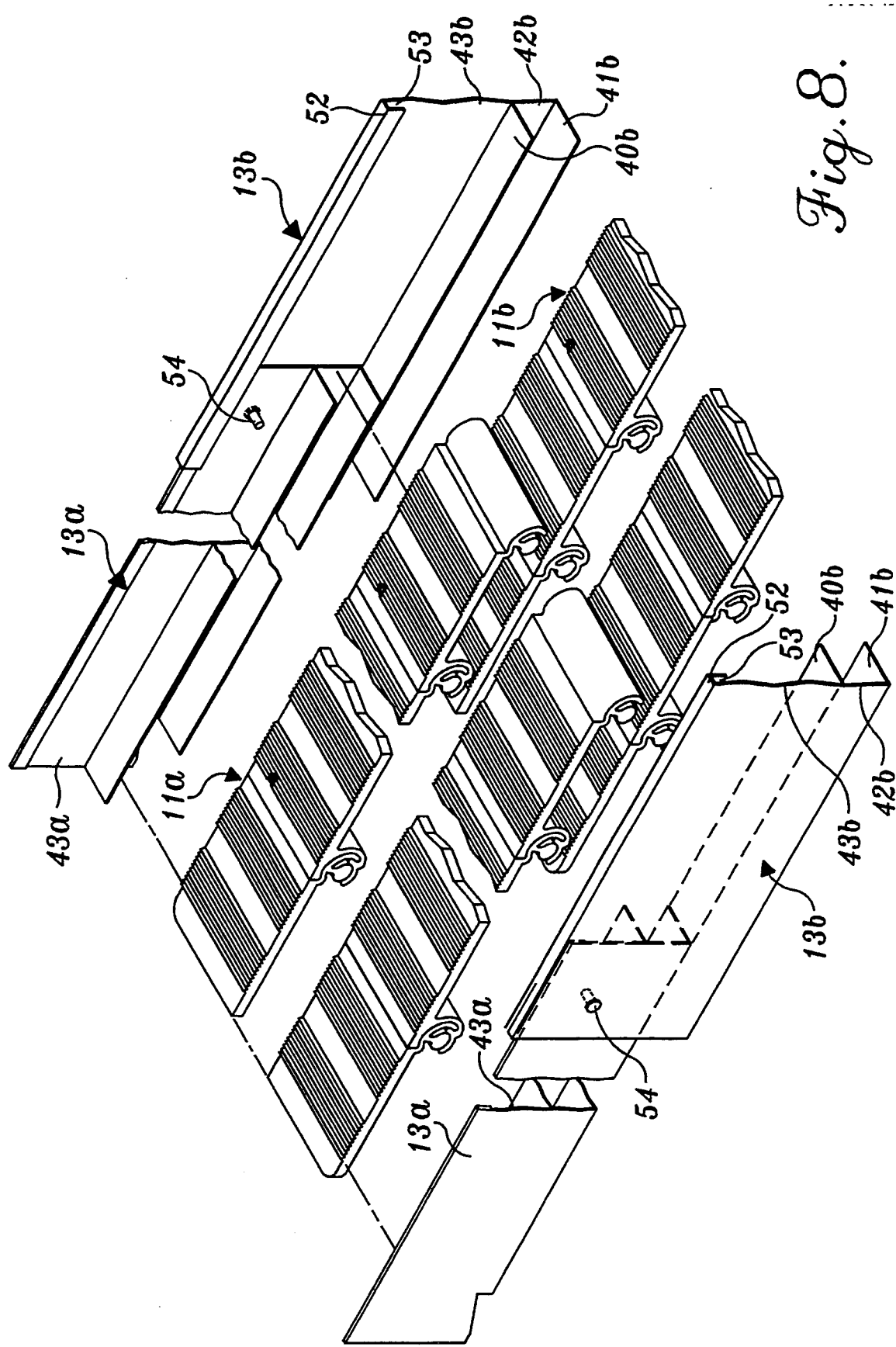
FIG. 8 is a top perspective of a modified form of portable knock-down ramp in accordance with the present invention with parts broken away and parts shown in exploded relationship.

A modified form of knock-down ramp in accordance with the present invention is illustrated in FIG. 8. The modified form uses two tread plate assemblies 11a and 11b, each identical to the tread plate assembly previously described. Assembly 11a can be connected to side rails 13a which are substantially identical to the side rails previously described by latch mechanism of the type previously described. The other tread plate assembly 11b, the assembly to the fight as viewed in FIG. 7, can be latched to modified side rails 13b by latch mechanism of the type previously described. The modified side rails 13b have upper and lower flanges 40b and 41b joined by an upright web 42b to form inward facing channels for closely receiving the side edges of the associated tread plate assembly 11b. The side flanges 43b of side rails 13b are higher than the flanges 43a of the upper side rails 13a, and the upper end portions 52 of flanges 43b are return bent toward the inside forming a narrow slot 53 that opens downward. The distance from the base of the slot 53 to the top of the upper flange 40b is approximately equal to the overall height of one of the upper side rails 13a so that the upper side rail can be positioned with the top of its flange 43a fitted in the slot 53 for a telescoping interconnection of the two side rails. Telescoped rails 13a and 13b at the same side preferably have registered apertures for a locking pin 54 to maintain the rails in a desired adjusted position. In such adjusted position, the lower tread plate assembly 11b is latched in the modified side rails 13b and the upper tread plate assembly 11a is latched in the side rails 13a so as to form an extension of the lower assembly (the lower end of assembly 11a overlaps the upper end of assembly 11b). The modified ramp shown in FIG. 8 still can be knocked down to a relatively few number of light compact pieces for easy transport and has the advantage of providing a longer assembled ramp for bridging higher obstructions at a modest angle of inclination.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A portable ramp for carrying a load, said ramp comprising a portable assembly having several tread plates pivotally connected together so as to be relatively swingable from an unrolled coplanar load-bearing condition to a rolled-up compact condition, at least one portable rail connectable to said tread plate assembly for maintaining said tread plate assembly in its unrolled coplanar condition, and means for normally latching said rail to said assembly for connecting said rail to said assembly, said latching means being manually releasable for disconnecting said rail from said assembly to permit said assembly to be rolled to its compact condition, said rail including vertically spaced flanges forming a channel therebetween, said tread plate assembly having a side marginal portion closely fittable in said channel to connect said tread plate assembly and said rail, said latching means including cooperating latch elements mounted on said assembly and said rail, respectively, for normally maintaining said tread plate assembly with said side marginal portion fitted in said channel.

2. The ramp defined in claim 1, in which the tread plates are elongated transversely of the length of the rail, each tread plate having an end portion fittable in the channel.

3. The ramp defined in claim 1, in which the tread plates have respective leading and trailing edges including complemental hinge components connecting the leading edge of one plate to the trailing edge of another.

4. The ramp defined in claim 3, in which the complemental hinge components include a first component having an arcuate lip and a second component having an arcuate slot receiving said lip, the tread plates having top portions with planar upper surfaces, said upper surfaces being substantially coplanar when the thread plates are unrolled and bridging over the complemental hinge components.

5. The ramp defined in claim 4, in which the first component includes a substantially cylindrical rod carried by the arcuate lip, the second component including a shelf portion having a concave depression for receiving the cylindrical rod.

6. The ramp defined in claim 3, in which the complemental hinge components include a first hinge component having a first generally semicylindrical lip having a convex side and a concave side, a stem cantilevered from the said concave side of said first lip, a cylindrical hinge rod carried at the end of said stem remote from said first lip, and a second hinge component including a second arcuate lip defining a concave surface substantially complemental to the convex side of said first lip, a stem projecting from said second lip and a shelf portion carried by said stem, said shelf portion having a concave depression for receiving said cylindrical hinge rod, the tread plates having top portions with planar upper surfaces, said upper surfaces being substantially coplanar when the tread plates are unrolled and bridging over the complemental hinge components.

7. The ramp defined in claim 6, in which the second lip, stem and shelf portion define an arcuate slot for receiving the first lip.

8. The ramp defined in claim 1, in which the tread plates have cooperating integral hinge joints pivotally connecting adjacent hinge plates, said hinge joints permitting relative swinging movement of adjacent plates from the coplanar condition in one direction but preventing swinging movement of such plates from the coplanar condition in the other direction.

9. The ramp defined in claim 8, in which the hinge joints include respective interfitting portions permitting relative rotation of the adjacent tread plates but restricting relative lengthwise movement of the tread plates.

10. A portable ramp for carrying a load, said ramp comprising a portable assembly having several elongated tread plates pivotally connected together so as to be relatively swingable from an unrolled coplanar load-bearing condition to a rolled-up compact condition, each of said tread plates having opposite ends aligned, respectively, with the opposite ends of the other plates and defining opposite sides of said assembly, two portable side rails connectable to said opposite sides of said assembly for maintaining said assembly in its unrolled coplanar condition, and means for normally latching said side rails to said assembly for connecting said rails to said assembly, said latching means being manually releasable for disconnecting said rails from said assembly to permit said assembly to be rolled to its compact condition, each of said side rails including vertically spaced flanges forming a channel therebetween, the opposite sides of the tread plate assembly being closely fittable in said channels, the latching means including cooperating latch elements mounted on the assembly and the rails, respectively, for normally maintaining the tread plate assembly with its opposite sides fitted in said channels.

11. The ramp defined in claim 10, in which the tread plates have respective leading and trailing edges including complemental hinge components connecting the leading edge of one plate to the trailing edge of another, the plates having planar top portions with planar upper surfaces, said upper surfaces being substantially coplanar when the tread plates are unrolled and bridging across said complemental hinge components.

12. The ramp defined in claim 11, in which the complemental hinge components include a first component having an arcuate lip and a second component having an arcuate slot receiving said lip.

13. The ramp defined in claim 12, in which the first component includes a substantially cylindrical rod carried by the arcuate lip, the second component including a shelf portion having a concave depression for receiving the cylindrical rod.

14. The ramp defined in claim 11, in which the complemental hinge components include a first hinge component having a first generally semicylindrical lip having a convex side and a concave side, a stem cantilevered from the concave side of said first lip, a cylindrical hinge rod carried at the end of said stem remote from said first lip, and a second hinge component including second arcuate lip defining a concave surface substantially complemental to the convex side of said first lip, a stem projecting from said second lip and a shelf portion carried by said stem, said shelf portion having a concave depression for receiving said cylindrical hinge rod.

15. The ramp defined in claim 14, in which the second lip, stem and shelf portion define an arcuate slot for receiving the first lip.

16. The ramp defined in claim 10, in which the tread plates have cooperating integral hinge joints pivotally connecting adjacent tread plates, said hinge joints permitting relative swinging movement of adjacent plates from the coplanar condition in one direction but preventing swinging movement of such plates from the coplanar condition in the other direction, the tread plates having top portions with planar upper surfaces, said upper surfaces being substantially coplanar when the tread plates are unrolled and bridging across said hinge joints.

17. The ramp defined in claim 16, in which the hinge joints include respective interfitting portions permitting relative rotation of the adjacent tread plates but restricting relative lengthwise movement of the tread plates.

18. A portable ramp for carrying a load, said ramp comprising a portable assembly having several tread plates pivotally connected together so as to be relatively swingable from an unrolled coplanar load-bearing condition to a rolled-up compact condition, at least one portable rail connectable to said tread plate assembly for supporting said tread plate assembly in its unrolled coplanar condition, and means for normally latching said rail to said assembly for connecting said rail to said assembly, said latching means being manually releasable for disconnecting said rail from said assembly to permit said assembly to be rolled to its compact condition, said latching means including cooperating latch elements mounted on said assembly and said rail, respectively, for normally supporting said tread plate assembly by said rail.

* * * * *

UNITED STATES PATENT AND TRADEMARK OFFICE
CERTIFICATE OF CORRECTION

PATENT NO. : 5,347,672
DATED : September 20, 1994
INVENTOR(S) : Everard et al.

It is certified that error appears in the above-identified patent and that said Letters Patent is hereby corrected as shown below:

On the title page, item:

| | | |
|---|---|---|
| [56] (Col. 1) | Refs. Cited (U.S. pats.) | "5/1872" should read --6/1872-- |
| Title Page (Col. 2) | Attorney, Agent or Firm | "Christenson" should read --Christensen-- |
| 4 | 58 | "fight" should read --right-- |
| 5 | 61 | "thread" should read --tread-- |

Signed and Sealed this

Twenty-eighth Day of November 1995

Attest:

BRUCE LEHMAN

*Attesting Officer*     *Commissioner of Patents and Trademarks*